United States Patent [19]

Shimp

[11] 4,358,551
[45] Nov. 9, 1982

[54] AQUEOUS AIR-DRYING CATIONIC EPOXY ESTER COATING COMPOSITIONS

[75] Inventor: David A. Shimp, Prospect, Ky.

[73] Assignee: Celanese Corporation, New York, N.Y.

[21] Appl. No.: 284,165

[22] Filed: Jul. 17, 1981

[51] Int. Cl.$^3$ .......... C08L 63/02; C09D 3/58; C09D 5/08; C09D 5/40
[52] U.S. Cl. .......... 523/414; 204/181 C; 523/402; 524/901
[58] Field of Search .......... 260/29.2 EP, 18 EP; 204/181 C; 523/402, 414; 524/901

[56] References Cited

U.S. PATENT DOCUMENTS

| | | | |
|---|---|---|---|
| 3,468,779 | 9/1969 | Slater et al. | 204/181 |
| 3,975,322 | 8/1976 | Reinshagen et al. | 260/18 EP |
| 3,984,299 | 10/1976 | Jerabek | 204/181 |
| 4,132,692 | 1/1979 | Görlitz et al. | 260/29.2 EP |
| 4,134,864 | 1/1979 | Belanger | 260/18 EP |
| 4,182,831 | 1/1980 | Hicks | 204/181 C |
| 4,199,487 | 4/1980 | Nakayama et al. | 260/23 AR |
| 4,246,087 | 1/1981 | Tsou et al. | 204/181 C |
| 4,278,580 | 7/1981 | Schmölzer et al. | 260/29.2 EP |
| 4,297,255 | 10/1981 | Schenck et al. | 260/29.2 EP |
| 4,304,700 | 12/1981 | Shimp et al. | 260/29.2 EP |

*Primary Examiner*—Ronald W. Griffin
*Attorney, Agent, or Firm*—Herbert P. Price

[57] ABSTRACT

Air-drying compositions useful as industrial maintenance coatings are made from aqueous solutions, dispersions or micro-emulsions of the salted reaction products of fatty acids and epoxy-amine adducts plus metal driers.

11 Claims, No Drawings

AQUEOUS AIR-DRYING CATIONIC EPOXY ESTER COATING COMPOSITIONS

BACKGROUND OF THE INVENTION

The field of art to which this invention pertains is water reducible coating compositions and to air-drying coatings made therefrom.

Water-borne coatings are being investigated for use in various industrial applications. One field of interest is the industrial maintenance field. Industrial maintenance coatings are coatings which are generally applied as primers and topcoats to metals and which must be resistant to corrosive atmospheres and to attack by chemicals and solvents. Industrial maintenance coatings are generally applied to existing structures by spraying or brushing and, therefore, the coatings must be capable of air-drying, i.e., drying or curing at ambient temperatures. Air-drying coatings usually used as industrual maintenace coatings are those coatings which dry or cure through autoxidative polymerization. Such coatings are generally based on resins derived from drying oils or modified with unsaturated fatty acids.

Water soluble or water dispersible resins from which water reducible air-drying coating compositions have been prepared are anionic resins, i.e. resins which contain acid groups, e.g., carboxylic acid groups, in their structure and which are solubilized with a base. Other resin systems are based on nonionic resins which are emulsified in water. Water soluble and water emulsifiable resins are described in U.S. Pat. No. 4,199,487.

Other types of water soluble or water dispersible resins which have been used to make water reducible coating compositions are cationic resins, i.e., resins which contain a basic nitrogen group and which are solubilized with an acid. Paints made from such cationic resins have been found to have superior corrosion resistance when formulated into primer paints. Such paints are particularly useful in electrodeposition processes and for industrial applications. However, such cationic coating compositions require heating for cure and have not been found useful for industrial maintenance applications.

U.S. Pat. No. 3,984,299 is representative of a number of patents which describe aqueous coating compositions made from adducts of epoxy resins and primary or secondary amines, said adducts being salted with acids to render them water soluble or water dispersible. The epoxy-amine adducts are modified by esterification with carboxylic acids, especially fatty acids. The preferred fatty acids are saturated fatty acids such as pelargonic acid. These cationic coating compositions are not air-drying compositions, but are formulated into heat curable compositions by the addition of a crosslinking agent, i.e., a blocked polyisocyanate.

Other cationic resins are described in U.S. Pat. No. 4,134,864. Such resins are made by reacting an epoxy resin with a polyamine followed by amidification with a monocarboxylic acid which can be saturated or unsaturated. These cationic resins contain residual amine hydrogen atoms and are not air-drying. Coating compositions formulated from such cationic resins contain crosslinking agents, such as aminoplast resins or phenolic resins, and are cured by being heated at elevated temperatures.

Cationic resin based coating compositions are also described in copending, commonly assigned patent application entitled "Cationic Epoxide-Amine Reaction Products", Ser. No. 256,747, filed Apr. 23, 1981, U.S. Pat. No. 4,339,369. The cationic resins are made by reacting an epoxy resin, a dihydric phenol and a tertiary amine which contains one primary hydroxyl group. Such resins are further modified with up to 25 weight percent of a monocarboxylic acid which can be saturated or unsaturated. These cationic coating compositions are not air-drying but are crosslinked by being heated with crosslinking agents.

Another water reducible coating composition is described in U.S. Pat. No. 3,468,779. Epoxy resin esters, i.e., epoxy resins esterified with unsaturated fatty acids, are emulsified in water using as the emulsifying agent a salt of a tertiary amine and a carboxylic acid. Coatings made from such compositions are deposited on metal substrates by electrodeposition and are cured by heating.

SUMMARY OF THE INVENTION

This invention pertains to air-drying coating compositions. In particular this invention relates to air-drying coating compositions which are reducible with water. More particularly this invention pertains to air-drying coating compositions which are based on acid salts of cationic resins.

The air-drying compositions of this invention are aqueous solutions, microemulsions or dispersions of acid salts of resinous reaction products of unsaturated fatty acids and epoxyamine adducts plus metallic driers. The resinous reaction products have titratable nitrogen contents within the range of about 0.3 to about 2 weight percent based on the weight of the resinous reaction product and contain no active amine hydrogen atoms. The reacted fatty acids are present in the amount of about 25 to about 50 weight percent based on the total weight of the resinous reaction product, the amount of fatty acid being sufficient to react with all the active amine hydrogen atoms in the epoxy-amine adduct. The epoxy-amine adduct is made by reacting an amine with a glycidyl polyether of a dihydric phenol and has a molecular weight of about 1000 to about 3000.

The metallic driers, which are heavy metal salts of organic acids, are present in the amount of about 0.02 to about 0.5 weight percent based on the total weight of the resinous reaction product. In addition to the metal driers, the air-drying composition can also contain 1,10 phenanthroline in the amount of about 0.04 to about 0.25 weight percent based on the total weight of the resinous reaction product.

DESCRIPTION OF THE INVENTION

The epoxy-amine adducts useful in this invention are the reaction products of glycidyl polyethers of dihydric phenols and amines and have molecular weights within the range of about 1000 to about 3000. Such adducts can be made by reacting a glycidyl polyether with a primary or secondary amine as described in U.S. Pat. No. 3,984,299 or by reacting a glycidyl polyether with a polyamine as described in U.S. Pat. No. 4,134,864. Useful epoxy-amine reaction products can also be prepared by reacting glycidyl polyethers with tertiary amines which contain one primary hydroxyl group as described in commonly assigned U.S. patent application, Ser. No. 256,747, filed Apr. 23, 1981, now U.S. Pat. No. 4,339,369. U.S. Pat. Nos. 3,984,299 and 4,134,864 and U.S. patent application, Ser. No. 256,747, now U.S. Pat. No. 4,339,369, are hereby incorporated by reference.

The glycidyl polyethers of dihydric phenols useful in this invention contain more than one up to two 1,2-epoxide groups per molecule. Such glycidyl polyethers are derived from dihydric phenol and epihalohydrins and have molecular weights of from about 800 to about 2800. Examples of epihalohydrins are epichlorohydrin, epibromohydrin and epiidohydrin with epichlorohydrin being preferred. Dihydric phenols are exemplified by resorcinol, hydroquinone, p,p'-dihydroxydiphenyl propane (or Bisphenol A as it is commonly called), p,p'-dihydroxybenzophenone, p,p'-dihydroxydiphenyl, p,p'-dihydroxydiphenyl ethane, bis (2-hydroxynaphthyl) methane, 1,5-dihydroxynaphthalene and the like. Preferred glycidyl polyethers are those derived from Bisphenol A and epichlorohydrin.

In preparing the epoxy-amine adducts useful in this invention, the glycidyl polyether before reaction with the amine should have a molecular weight within the range of about 800 to about 2800. However, the reaction can be begun with a glycidyl polyether having a molecular weight as low as 220. When using a glycidyl polyether having a low molecular weight, i.e., below 800, the molecular weight is increased to 800 to 2800 by reaction with additional dihydric phenol prior to the addition of the amine or in an "in situ" reaction as described in copending application, Ser. No. 256,747, now U.S. Pat. No. 4,339,369.

The amines useful in forming the epoxy-amine adducts are aliphatic monoamines and polyamines, and are primary, secondary, or tertiary amines and must contain at least one active amine hydrogen atom or one primary hydroxyl group. Useful primary and secondary monoamines are those described in U.S. Pat. No. 3,984,299. Examples of such amines include mono- and dialkylamines which contain one to about 20 carbon atoms in each alkyl group. Additional amines are the mono- and dialkanolamines which contain 2 to 3 carbon atoms and one hydroxyl group in each alkanol group. Examples of such amines include ethylamine, propylamine, butylamine, dimethylamine, dibutylamine, nonylamine, dinonylamine, ethanolamine, diethanolamine, dipropanolamine and the like. Preferred amines are secondary amines which produce tertiary amine adducts. When primary amines are used, the resulting secondary amine adducts can be converted to tertiary amines by being reacted with a monoepoxide.

Useful aliphatic polyamines are those described in U.S. Pat. No. 4,134,864. Such amines contain at least 2 amine nitrogen atoms per molecule, at least 3 amine hydrogen atoms per molecule and no other groups which are reactive with epoxide groups. Such useful polyamines contain two to about six amine nitrogen atoms per molecule, three to about eight amine hydrogen atoms and two to about twenty carbon atoms. Examples of such amines are ethylenediamine, 1,2-propylenediamine, diethylenetriamine, tetraethylenepentamine, pentaethylenehexamine and the like. Additional polyamines are those described in U.S. Pat. No. 4,182,831 which is hereby incorporated by reference. Such polyamines contain one primary amine group and one tertiary amine group, such as 3-diethylaminopropylamine.

Useful tertiary amines which contain one primary hydroxyl group as described in copending application, Ser. No. 256,747, now U.S. Pat. No. 4,339,369. Such amines can be represented by the formula:

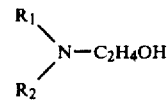

wherein $R_1$ and $R_2$ are alkyl groups, the carbon atoms of which have a sum of 2 to 6. Examples of such amines are dimethylethanolamine, diethylethanolamine, methylpropylethanolamine and the like. An additional useful amine of this type is N-hydroxyethyl morpholine.

In order to incorporate air-drying capability into the compositions of this invention, the epoxy-amine adducts are reacted with unsaturated fatty acids through an esterification or amidification reaction with hydroxyl group and/or amine groups in the epoxy amine adducts. The acids are utilized in the amount of about 25 to about 50 weight percent based on the total weight of adduct and acid with the proviso that when the epoxy-amine adducts contain primary or secondary amine groups, sufficient acid is used to react with all of the active amine hydrogens. The unsaturated fatty acids useful in this invention are those acids which contain from 16 to 22 carbon atoms and which contain at least one ethylenically unsaturated group. Examples of such acids are oleic acid, linoleic acid, linolenic acid, eleostearic acid, liconic acid, dehydrated ricinoleic acid, erucic acid, arachidonic, and the like. Particularly useful unsaturated fatty acids are those derived from naturally occurring acids and oils and which are named from the source, e.g., tall oil fatty acids, linseed fatty acids, soya fatty acids, dehydrated castor fatty acids, and the like. The unsaturated fatty acid is reacted with the epoxyamine adduct under amidifying or esterifying conditions at a temperature of about 150° C. to about 250° C. with removal of water until the acid value is reduced below 10. In order to have sufficient water solubility and dispersibility when salted with an acid, the fatty acid-/epoxy-amine adduct reaction products should have a titratable nitrogen content of from about 0.3 to about 2% based on the reaction product weight.

After the esterification or amidification reaction has been completed, the resinous product is dissolved in a water miscible organic solvent, e.g., alcohols and alkylene glycol mono and diethers. The amount of solvent will vary but is usually just that amount which will render the resin sufficiently fluid to be dispersed in water. The amount of solvent will vary from about 15 to about 45 weight percent based on total weight of solution of reaction product and solvent. Specific solvents are ethanol, isopropanol, butanol, methoxyethanol, methoxypropanol, ethoxyethanol, ethoxypropanol, propoxyethanol, monomethyl ether of diethylene glycol, dimethyl ether of ethylene glycol and the like.

In order to prepare the aqueous compositions of this invention, the resinous compositions must be neutralized. Neutralization is accomplished by salting all or part of the amine groups in the epoxy-amine adduct with a water soluble volatile acid, e.g., formic acid, acetic acid, etc. The extent of neutralization will depend upon the particular resin and it is only necessary to use sufficient acid to solubilize or disperse the resin. The amount of acid will vary from about 0.2 to about 1.0 equivalent for each amine equivalent in the resinous composition and, preferably, about 0.3 to about 0.8 equivalent. The pH range is about 4.5 to about 7.0.

The term "solutions" as used in this invention is intended to describe not only true solutions but colloidal solutions, dispersions, microemulsions or other dispersed aggregates of resin in water characterized by aggregate diameters of less than 0.1 micron, spontaneous formation and nonsedimenting at high dilution.

In order that the aqueous compositions have air-drying capability, i.e., ability to form a thermoset coating at ambient temperatures, metallic driers must be present. Such driers are heavy metal salts of organic acids. Drier metals include lead, cobalt, manganese, zinc, calcium, and iron. The organic acids include such acids as linoleic acid, derived from linseed oil, tall oil acids, rosin acids, naphthenic acid, octoic acid and neodecanoic acid. Preferred are the cobalt manganese and zinc salts of naphthenic, neodecanoic and octoic acids. It is standard practice in the coatings field to specify the amount of drier metal rather than the amount of drier to be used with the air-drying resins. In the practice of this invention the amount of drier metal will range from about 0.02 to about 0.6 weight percent based on the weight of fatty acid/epoxy-amine adduct reaction product.

In order to stabilize the driers and to prevent loss of drying on aging, a drier stabilizer and activator based on 1,10-phenanthroline can be added in the amount of about 0.1 to about 0.6 weight percent based on the weight of fatty acid/epoxyamine adduct reaction product. This stabilizer and activator is sold as Activ-8 by R. T. Vanderbilt Company. In "Organic Coating Technology" by H. F. Payne, John Wiley & Sons, Inc., New York (1954), p. 236, the composition of Activ-8 is listed as follows:

|  | Wt. % |
| --- | --- |
| 1,10-phenanthroline | 38 |
| 2-ethylhexoic acid | 22 |
| n-butanol | 40 |

The air-drying composition of this invention can be used as clear coatings, i.e., non-pigmented, but, preferably, are pigmented. Useful pigments are titanium dioxide, carbon black, iron oxides, chrome oxides, lead chromates, silica, barytes and the like. Such pigments are used in amounts from about 1 to about 200 weight percent based on the weight of the fatty acid/epoxyamine adduct.

The following examples will describe the invention in more detail. Parts and percentages are parts and percentages by weight unless otherwise designated.

EXAMPLE 1

To a suitable reactor were added 100.9 parts of Bisphenol A and 276.2 parts of diethylaminoethanol. Heating and stirring were begun and at 80° C., the addition of 284.8 parts of the diglycidyl ether of Bisphenol A having an epoxide equivalent weight of 193 was begun. The addition was completed in 26 minutes with the temperature at 82° C. The temperature was raised to 102° C. and was held at 101°-108° C. for one hour and 39 minutes. The reactor was then fitted for distillation and the temperature was raised to 170° C. where distillation began. After 28 minutes the temperature reached 185° C. and vacuum was slowly applied. Full vacuum (30 inches Hg) was obtained in 17 minutes and the temperature reached 198° C. Vacuum and heating were held for 25 minutes, at which point the distillation of unreacted amine was completed.

To the cooled epoxy-amine reaction product were added 228.4 parts of tall oil fatty acids and a small amount of toluene. The reactor was fitted with a Barret trap for azeotropic distillation of water of esterification. Heat was applied and at 189° C., water began to distill. Heating with distillation was continued for 10 hours with the temperature rising to 230° C. A total of 12 parts of water was collected. The resulting ester was then thinned with 212.7 parts of propoxyethanol. The ester solution had a solids content of 71.93% (30 minutes at 150° C.) and a Gardner-Holdt viscosity at 25° C. of $Z_6$-$Z_7$.

The ester solution was salted with acetic acid in various amounts and was diluted with water to a Gardner-Holdt viscosity in the E-G range. The properties of the resulting microemulsions were as follows:

| Example | 1A | 1B | 1C | 1D | 1E |
| --- | --- | --- | --- | --- | --- |
| Ester Solution, parts | 20 | 20 | 20 | 20 | 20 |
| Propoxyethanol, parts | 1.0 | 1.0 | 1.0 | 1.0 | 1.0 |
| Acetic Acid, 50% Aq., parts | 0.58 | 0.49 | 0.39 | 0.30 | 0.24 |
| Deionized H$_2$O, parts | 30.0 | 25.0 | 20.0 | 15.0 | 12.0 |
| Salting Level, % | 60 | 50 | 40 | 30 | 25 |
| % N.V. | 27.9 | 30.9 | 34.8 | 39.6 | 43.3 |
| Clarity | TL | TL | TL | TL-OP | OP |
| pH | 5.35 | 5.65 | 5.9 | 6.25 | 6.7 |
| Stability | OK | OK | OK | OK | OK |

TL = Translucent
OP = Opaque with opalescence

EXAMPLE 2

To a suitable reactor were added 209.6 parts of Bisphenol A and 820.4 parts of diethylethanolamine. Heating and stirring were applied and at 79° C., the slow addition of 470 parts of the diglycidyl ether of Bisphenol A having an epoxide equivalent weight of 190 was begun. The addition was completed in one hour and 35 minutes with the temperature being controlled between 71° and 100° C. After ½ hour additional heating, the temperature was 95° C. The temperature was then raised to 130° C. over a period of 1 hour and 15 minutes. After 1 hour and 10 minutes additional heating, the temperature was 163° C., at which point distillation of the excess unreacted amine had begun. Heating and distilling were continued for 2 hours with the temperature rising to 204° C. Vacuum was then slowly applied to an absolute pressure of 15 mm. Hg in 10 minutes with the temperature dropping to 193° C. After 5 minutes, the temperature had risen to 204° C. Steam sparge was then applied for 30 minutes followed by heating under vacuum at 204° C. for 10 minutes.

To 405 parts of the cooled reaction product from above were added 218.1 parts of tall oil fatty acids and 30 parts of toluene. The reactor was fitted with a Barret trap for azeotropic distillation and heating and stirring were begun. When the temperature reached 177° C., water began to distill azeotropically. Heating with removal of water and portions of the toluene refluxing solvent was continued for 9 hours and 40 minutes with the temperature of the reactants rising to 233° C. Heating was discontinued and the resulting ester product was thinned with 203.1 parts of propoxyethanol. The product solution had a solids content of 73.3% (½ hour at 150° C.), a Gardner-Holdt viscosity at 25° C. of $Z_5$ and a Gardner Color of 11. The acid value was 2.9 and % titratable nitrogen was 0.64, both of these constants being on 100% solids basis.

The ester solution was salted with acetic acid in various amounts and was diluted with water to a Gardner-Holdt viscosity in the E-G range. The properties of the resulting microemulsions were as follows:

| Example | 2A | 2B | 2C | 2D |
|---|---|---|---|---|
| Ester Solution, parts | 20 | 20 | 20 | 20 |
| Propoxyethanol, parts | 1.0 | 1.0 | 1.0 | 1.0 |
| Acetic Acid, 50% Aq., parts | 0.48 | 0.40 | 0.32 | 0.24 |
| Deionized H₂O, parts | 30.0 | 25.0 | 20.0 | 12.0 |
| Salting Level, % | 60 | 50 | 40 | 30 |
| % N.V. | 28.5 | 31.6 | 35.5 | 43.3 |
| Clarity | TL | TL-OP | OP | OP |
| pH | 5.35 | 5.5 | 5.7 | 6.4 |
| Stability | OK | OK | OK | OK |

TL = Translucent
OP = Opaque with opalescence

EXAMPLE 3

Using the same procedure described in the preceding examples, 352.8 parts of Bisphenol A, 724.5 parts of diethylaminoethanol and 796.8 parts of the diglycidyl ether of Bisphenol A having an epoxide equivalent weight of 193 were reacted. After the reaction was completed and after removal of the excess unreacted diethylaminoethanol, the epoxy-amine reaction product was esterified with 663.3 parts of tall oil fatty acids and the resulting ester was dissolved in 720.9 parts of propoxyethanol. The resinous ester solution had a solids content of 70.47% (30 minutes at 150° C.) and a Gardner-Holdt viscosity at 25° C. of $Z_6$. The acid value was 2.7 and the titratable nitrogen was 0.59%, both these constants being on a solids basis.

To 110.8 parts of the ester solution were added 85 parts of titanium dioxide pigment. The mixture was ground on a high speed dispersator to enamel texture. To the pigment paste were added 6 parts of propoxyethanol, 0.93 parts of glacial acetic acid, 0.65 part of cobalt naphthenate (6% cobalt) and 0.48 part of zinc neodecanate (16% zinc). After mixing well, 0.7 part of L-475 Defoamer (Drew Chemical Co.) was added followed by 50 parts of deionized water. After standing overnight, the paint was further diluted with 11 parts of deionized water. The resulting paint had a solids content of 61.8%, a pH of 6.2 and a viscosity of 80 KU. Drawdowns were made on glass panels with the following results:

| Thickness of Drawdown, mils | 3 | 1.5 |
|---|---|---|
| Tack Free Dry, hours | 4 | 1.0 |
| Print Free Dry, hours | Overnight | 8 |
| Gloss at 60° | 96 | 94 |
| Pencil Hardness - | | |
| Overnight | <6B | 2B |
| 2 Days | 3B | 2B |
| 3 Days | 2B | 2B |
| 6 Days | B | B |
| 14 Days | B | HB |
| Hot Box Stability - 2 Weeks at 50° C. | No Change | No Change |

Another paint was made using the preceding procedure and the same formulation except 0.99 part of zinc neodecanate was used and the paint was diluted with 42 parts and 11.5 parts of deionized water. The paint so produced had a solids content of 63.9%, a pH of 6.35 and a viscosity of 85 KU. Drawdowns were made on glass panels with the following results:

| Thickness of Drawdown, mils | 3 | 1.5 |
|---|---|---|
| Tack Free Dry, hours | 4.5 | 2 |
| Print Free Dry, hours | Overnight | 8 |
| Gloss at 60° | 95 | 92 |
| Pencil Hardness - | | |
| Overnight | <6B | 2B |
| 2 Days | 2B | 2B |
| 3 Days | 2B | 2B |
| 6 Days | B | B |
| 14 Days | B | HB |
| Hot Box Stability - 2 Weeks at 50° C. | No change in appearance or water reducibility. | No change in appearance or water reducibility. |

EXAMPLE 4

Using the same procedure described in the preceding examples, 1664 parts of Bisphenol A, 3420 parts of diethylaminoethanol and 3680 parts of the diglycidyl ether of Bisphenol A having an epoxide equivalent weight of 190 were reacted. After removal of the excess unreacted diethylethanolamine, the reaction product was esterified with 3124 parts of tall oil fatty acids followed by solubilization in 3107 parts of propoxyethanol. The resulting solution had a solids content of 73.1% (30 minutes at 150° C.) and a Gardner-Holdt viscosity at 25° C. of $Z_6$-$Z_7$. The acid value was 3.16 and the titratable nitrogen was 0.59%, both on 100% solids basis.

To 104.4 parts of the resinous ester solution were added 1.3 parts of glacial acetic acid and 78 parts of titanium dioxide. The mixture was ground on a high speed dispersator to an enamel texture. Cobalt naphthenate (6% cobalt), 0.62 part, was then added to the pigment paste followed by 0.7 part of L-475 Defoamer from Drew Chemical Company and 75 parts of deionized water. After standing overnight, an additional 8 parts of deionized water were added to reduce the viscosity of approximately 70 KU.

Additional paints were made using the same procedures but varying the driers and the amounts of deionized water. These variations were as follows:

| PAINT | DRIER | AMOUNT | DI WATER 1st ADD | DI WATER 2nd ADD |
|---|---|---|---|---|
| 4-1 | Cobalt Naphthenate (6% Cobalt) | 0.62 | 75 | 8 |
| 4-2 | Cobalt Naphthenate (6% Co) | 0.59 | 70 | 15 |
|  | Zinc Neodecanate (16% Zn) | 0.45 |  |  |
| 4-3 | Hydro-Cure (5% Co) Mooney Chemicals, Inc. | 0.30 | 70 | 18 |
| 4-4 | Hydro-Cure (5% Co) | 0.74 | 75 | 15 |
| 4-5 | Cobalt Naphthenate (6% Co) | 0.23 | 75 | 15 |
|  | Activ-8 R.T. Vanderbilt Co. | 0.15 |  |  |
| 4-6 | Manganese Naphthenate (6% Mn) | 0.23 | 75 | 18 |

-continued

| PAINT | DRIER | AMOUNT | DI WATER 1st ADD | DI WATER 2nd ADD |
|---|---|---|---|---|
|  | Activ-8 | 0.15 |  |  |
| 4-7 | Cobalt Naphthenate (6% Co) | 0.61 | 75 | 20 |
|  | Zinc Neodecanate (16% Zn) | 0.47 |  |  |
|  | Activ-8 | 0.38 |  |  |
| 4-8 | Cobalt Naphthenate (6% Co) | 0.62 | 75 | 15 |
|  | Activ-8 | 0.38 |  |  |

Drawdowns (1.5 mils) were made on glass panels from the paints listed hereinbefore. The coated panels were then dried and evaluated.

| PAINT | TACK FREE | PENCIL HARDNESS | | | |
|---|---|---|---|---|---|
|  |  | 1 DAY | 2 DAYS | 3 DAYS | 6 DAYS |
| 4-1 | Overnight | 3B | 3B | 3B | 2B |
| 4-2 | Overnight | 3B | 3B | 3B | 2B |
| 4-3 | Overnight | <6B | 5B | 5B | 2B |
| 4-4 | Overnight | 3B | 3B | 3B | B |
| 4-5 | Overnight | 5B | 3B | 3B | 3B |
| 4-6 | Overnight | 3B | 3B | 3B | 3B |
| 4-7 | Overnight | 3B | 3B | 2B | B |
| 4-8 | Overnight | 3B | 3B | 2B | B |

The paints were left at room temperature for 1 week. Drawdowns (1.5 mils) were made from the aged paints on glass panels. The coatings were smooth in appearance.

| PAINT | PENCIL HARDNESS | |
|---|---|---|
|  | 1 DAY | 2 DAYS |
| 4-1 | 5B | 3B |
| 4-2 | 5B | 3B |
| 4-3 | 6B | 4B |
| 4-4 | 3B | 2B |
| 4-5 | 4B | 3B |
| 4-6 | 4B | 3B |
| 4-7 | 4B | 3B |
| 4-8 | 4B | 3B |

After 3 weeks aging at room temperature, 1.5 mil drawdowns on glass were smooth with no change in appearance from the previous drawdowns.

| PAINT | PENCIL HARDNESS | | | |
|---|---|---|---|---|
|  | 1 DAY | 2 DAYS | 3 DAYS | 7 DAYS |
| 4-1 | 5B | 5B | 2B | 2B |
| 4-2 | 3B | 3B | 2B | 2B |
| 4-3 | 5B | 4B | 4B | 4B |
| 4-4 | 5B | 3B | 2B | 2B |
| 4-5 | 3B | 3B | 2B | 2B |
| 4-6 | 3B | 3B | 3B | B |
| 4-7 | 3B | 3B | B | B |
| 4-8 | 3B | 3B | B | B |

All of the paints were aged for 1 week at 120° F. Drawdowns (1.5 mils) were made on glass panels from each of the paints.

| PAINT | APPEARANCE | PENCIL HARDNESS | |
|---|---|---|---|
|  |  | 1 DAY | 2 DAYS |
| 4-1 | Smooth | <6B | 5B |
| 4-2 | Seedy | <6B | 3B |
| 4-3 | Smooth | <6B | 5B |
| 4-4 | Seedy | <6B | 2B |
| 4-5 | Seedy | 5B | 3B |
| 4-6 | Seedy | 3B | 3B |
| 4-7 | Seedy | 3B | 3B |
| 4-8 | Seedy | 3B | 3B |

All the paints were aged for 3 weeks at 120° F. Drawdowns (1.5 mils) were made on glass panels from each of the paints. All films were seedy.

| PAINT | PENCIL HARDNESS | | | |
|---|---|---|---|---|
|  | 1 DAY | 2 DAYS | 3 DAYS | 7 DAYS |
| 4-1 | <6B | 6B | 4B | 3B |
| 4-2 | <6B | 5B | 5B | 3B |
| 4-3 | <6B | <6B | <6B | 4B |
| 4-4 | <6B | 5B | 4B | 3B |
| 4-5 | 3B | 3B | 3B | 2B |
| 4-6 | 5B | 3B | 3B | 3B |
| 4-7 | 5B | 3B | 3B | 3B |
| 4-8 | 3B | 3B | 2B | B |

EXAMPLE 5

With 405 parts of the epoxy resin, Bisphenol A, amine reaction products described in the first paragraph of Example 2 were reacted 270 parts of tall oil fatty acids following the procedure of Example 2. At the completion of the esterification reaction, the product was dissolved in 208 parts of propoxyethanol. The resulting solution had a solids content of 74.8% (30 minutes at 150° C.), and a Gardner-Holdt viscosity at 25° C. of $Z_4$-$Z_5$. The acid value and % titratable nitrogen on a 100% solids basis was 6.2 and 0.56 respectively.

Paints were made from the resinous ester solution by adding the listed ingredients in the order shown.

| PAINT | 5-A | 5-B | 5-C | 5-D |
|---|---|---|---|---|
| Ester Solution | 104 | 104 | 104 | 104 |
| Titanium Dioxide | 85 | 85 |  |  |
| Iron Oxide |  |  | 20 |  |
| Basic Lead Silicochromate |  |  | 80 |  |
| Strontium Chromate |  |  |  | 20 |
| GRIND ON HIGH SPEED DISPERSATOR TO ENAMEL TEXTURE | | | | |
| Propoxyethanol | 6.0 | 6.0 | 6.0 | 6.0 |
| Glacial Acetic Acid | 1.08 | 1.08 | 3.0 | 1.20 |
| Cobalt Naphthenate (6% Co) | 1.30 | 1.30 | 1.30 | 1.30 |
| Manganese Naphthenate (6% Mn) |  | 0.26 |  |  |
| Activ 8 |  | 0.93 |  |  |
| L-475 Defoamer | 0.7 | 0.7 | 0.7 | 0.7 |
| D.I. Water | 60 | 60 | 70 | >125 |
| pH | 5.8 | 5.7 | 5.7 | Not Water |
| Viscosity, KU | 69 | 64 | 68 | Reducible |

To test hot box stability, the paints in sealed containers were heated for 3 weeks at 50° C. with the following results:

5-A Settled and thickened. OK after stirring and a small amount of thinning.

5-B Similar to 5A except slightly thicker.

5-C Very stiff settlement. Could not be redispersed.

Cold rolled steel panels were given one coat of Paint 5-B (1.6 mil thickness) and 2 coats (2.4 mils). The panels were tested for salt spray resistance after being scribed with an X down to the substrate. After 137 hours exposure, the panels exhibited high gloss, the field condition was OK and there were scattered blisters on the scribe. A sand blasted steel panel, given 2 coats of Paint 5-B to a coating thickness of 2.7 mils gave similar salt spray results.

Glass panels coated with Paints 5-A and 5-B were airdried for 6 weeks at room temperature. The coatings were tested for chemical and stain resistance with various substances. Contact period was 20 hours under watch glasses.

| CHEMICAL OR STAIN | PAINT A | PAINT B |
|---|---|---|
| Deionized Water | No Effect | No Effect |
| 10% Aq. NaOH | Brown & Soft | Brown & Soft |
| 10% Aq. HCl | No Effect | Dull |
| 5% Aq. Acetic Acid | Dull | No Test |
| 5% Aq. NaOCl | No Test | No Effect |
| 2% Tide | No Test | No Effect |
| Gasoline | No Test | Soft |
| Kerosene | No Test | No Effect |
| Coffee | No Effect | No Test |
| Lemon Juice | No Effect | No Test |

EXAMPLE 6

To a suitable reactor were added 775.3 parts of triethylene tetramine. Heat and agitation were applied raising the temperature to 140° F. To the reactor were added 1289.8 parts of a solution, at 71.5 percent solids in toluene, of a glycidyl polyether of Bisphenol A having an epoxide equivalent weight of 775.5. This addition was completed in 2 hours and 10 minutes with the temperature being held at 138°–140° F. Heating at 140° F. was continued for 30 minutes. The reactor was then fitted for vacuum distillation and steam sparge. Heat was applied and at 270° F., distillation began. Heating was continued and when the pot temperature reached 400° F., vacuum (30 inches Hg pressure) was applied. After 3 hours and 30 minutes at 400° F., steam sparge was applied. After 1 hour and 30 minutes with the temperature at 410° F., distillation was discontinued. The resulting product, 1238.4 parts, had a % titratable nitrogen of 8.39 and a solids content of 95.4% (30 minutes at 150° C.).

In view of the low solids and high titratable nitrogen, the product was restripped at a higher temperature. The product, 1147.2 parts, and 50 parts of toluene were added to a reactor and heat was applied. At 340° F., distillation began and at 440° F., vacuum was gradually applied. After 15 minutes, the temperature reached 450° F. and the vacuum was at 30 inches Hg pressure. After 20 minutes at 450° F., steam sparge was begun. Heating with steam sparge was continued for 15 minutes. Steam was then stopped and heating was continued at 450° F. for 15 minutes. The resulting product, 1014.9 parts, had a titratable nitrogen content of 5.94% and a solids content of 99.3% (30 minutes at 150° C.).

To a suitable reactor were added 250 parts of the epoxyamine adduct prepared above and 100 parts of toluene. The components were heated to form a solution and at a temperature of 150° F., 24 parts of propylene oxide were added over a period of 1 hour and 25 minutes with the temperature being held at 150°–160° F. Heating in this temperature range was continued for 2 hours. The reactor was then fitted with a Barret trap for azeotropic distillation of the water of amidification and esterification and 250 parts of tall oil fatty acids were added. Heating was increased and at 265° F., distillation began. Heating was continued for 6 hours and 15 minutes with the temperature rising to 400° F. Propoxyethanol, 218 parts, was then slowly added. The resulting amidified and esterified epoxy-amine adduct had a solids content of 68.9% (30 minutes at 150° C.), an acid value of 4.89 and a titratable nitrogen of 1.5%, both on solids basis. The Gardner-Holdt viscosity at 25° C. was Z-Z$_1$ and the Gardner color was 13.

The adduct solution was salted with acetic acid in various amounts and was diluted with water to a Gardner-Holdt viscosity in the E-G range. The properties of the resulting microemulsions were as follows:

| EXAMPLE | 6A | 6B | 6C | 6D |
|---|---|---|---|---|
| Adduct Solution, parts | 25 | 25 | 25 | 25 |
| Glacial Acetic Acid, parts | 0.28 | 0.44 | 0.67 | 1.11 |
| Deionized Water, parts | 20.8 | 25 | 31.8 | 37.8 |
| Salting Level, % | 25 | 40 | 60 | 100 |
| % N.V. | 37.4 | 34.2 | 30.0 | 27.0 |
| Clarity | OP | OP | OPAL | TL |
| Clarity, after 2 hrs. | Separating | Separating | OPAL | TL |
| pH | 5.65 | 5.2 | 4.8 | 4.5 |

OP = Opaque
OPAL = Opaque with Opalescence
TL = Translucent

A clear unpigmented paint was made by mixing 48.37 parts of the epoxy-amine adduct solution with 1.3 parts of glacial acetic acid. To this solution were added 0.28 part of cobalt naphthenate drier (6% Co), 0.17 part of Activ 8, 0.33 part of L-475 Defoamer and 51.3 parts of deionized water. After standing overnight, the viscosity was adjusted with 7.9 parts deionized water. The % salting was 60%, the solids content, calculated, was 30.75%, the pH was 4.85 and the Gardner-Holdt viscosity at 25° C. was H. Films, 1.5 mils, were drawn down on glass, the films were left at room temperature and the pencil hardness was determined at the listed intervals.

| DAYS AT R.T. | PENCIL HARDNESS |
|---|---|
| 1 | 6B |
| 2 | 6B |
| 6 | 5B |
| 10 | 4B |
| 60° Gloss | 87 |

A pigmented paint was prepared by mixing 96.73 parts of the epoxy-amine adduct solution with 2.59 parts glacial acetic acid and 71.33 parts titanium dioxide pigment. The mixture was ground to enamel texture on a high speed dispersator. To the pigment paste were added 0.56 part of cobalt naphthenate drier (6% Co), 0.35 part of Activ 8, 0.67 part of L-475 Defoamer and 75.0 parts of deionized water. After standing overnight, the viscosity was adjusted with 18.0 parts of deionized water. The resulting paint had a viscosity of 77 KU, a pH of 5.10, a calculated solids content of 52.32 and a % salting of 60. Films, 1.5 mils, were drawn down on glass, the films were left at room temperature and the pencil hardness was determined at the listed intervals.

| DAYS AT R.T. | PENCIL HARDNESS |
|---|---|
| 1 | 6B |
| 2 | 6B |
| 6 | 5B |
| 10 | 3B |
| 60° Gloss | 71 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An air-drying coating composition comprising
   (a) an aqueous solution of an acid salt of a resinous reaction product of an unsaturated fatty acid and an epoxy-amine adduct, said resinous reaction product having a titratable nitrogen content of about 0.3 to about 2 weight percent and no active amine hydrogen atoms; and
   (b) metallic driers wherein the unsaturated fatty acid is reacted with the epoxy-amine adduct in the amount of about 25 to about 50 weight percent based on total weight of the resinous reaction product, wherein the unsaturated fatty acid contains 16 to 22 carbon atoms and at least one ethylenically unsaturated group, wherein the epoxy-amide adduct has a molecular weight of about 1000 to about 3000 and is made by reacting glycidyl polyethers of dihydric phenols with amines and wherein the metallic driers are present in the amount of about 0.02 to about 0.5 weight percent metal based on total weight of the resinous reaction product.

2. The composition of claim 1 which contains about 0.04 to about 0.25 weight percent 1,10 phenanthroline based on the total weight of the resinous reaction product.

3. The composition of claim 1 wherein the glycidyl polyether is a glycidyl polyether of p,p'-dihydroxydiphenyl propane having an epoxide equivalent weight of about 800 to about 2800.

4. The composition of claim 1 wherein the amine is an aliphatic primary or secondary monoamine.

5. The composition of claim 1 wherein the amine is an aliphatic polyamine which contains at least 2 amine nitrogen atoms and at least 3 amine hydrogen atoms per molecule.

6. The composition of claim 1 wherein the amine is an aliphatic polyamine which contains one primary amine group and one tertiary amine group.

7. The composition of claim 1 wherein the amine is an aliphatic monoamine which contains one tertiary amine group and one primary hydroxyl group.

8. The composition of claim 1 wherein the fatty acids are tall oil fatty acids.

9. The composition of claim 1 wherein the driers are selected from at least one member of the group consisting of cobalt, manganese and zinc salts of organic acids.

10. The composition of claim 1 wherein the resinous reaction product is salted with acetic acid.

11. The pigmented composition of claim 1.

* * * * *